United States Patent [19]

Winch et al.

[11] Patent Number: 4,587,805
[45] Date of Patent: May 13, 1986

[54] ELECTRO-OPTICAL CONTROL OF SOLID FUEL ROCKET BURN RATE

[75] Inventors: Peter C. Winch, Elizabeth East, Australia; Mick Blackledge, Lancaster, Calif.

[73] Assignee: The United States of America as represented by the Secretary of the Air Force, Washington, D.C.

[21] Appl. No.: 696,298

[22] Filed: Jan. 29, 1985

[51] Int. Cl.⁴ .................................................. F02K 9/26
[52] U.S. Cl. .......................................... 60/234; 60/254; 102/289
[58] Field of Search ........................ 60/234, 253, 254; 102/201, 287, 289, 291

[56] References Cited

U.S. PATENT DOCUMENTS

| | | | |
|---|---|---|---|
| 3,065,597 | 11/1962 | Adamson et al. | 60/35.3 |
| 3,066,482 | 12/1962 | Rod | 60/35.6 |
| 3,129,562 | 4/1964 | Kuehl et al. | 60/234 |
| 3,182,451 | 5/1965 | Messerly | 60/35.6 |
| 3,248,875 | 5/1966 | Wolcott | 60/35.6 |
| 3,398,537 | 8/1968 | Picquendar | 60/254 |
| 3,408,937 | 11/1968 | Lewis et al. | 102/201 |
| 3,457,726 | 7/1969 | Trotel | 60/250 |
| 3,529,425 | 9/1970 | DeHaye | 60/254 |
| 3,630,028 | 12/1971 | Caveny | 60/234 |
| 3,732,693 | 5/1973 | Chu | 60/207 |
| 4,345,427 | 8/1982 | Whitesides, Jr. | 60/234 |
| 4,369,710 | 1/1983 | Okamoto et al. | 102/289 |
| 4,391,195 | 7/1983 | Shaun | 102/201 |

Primary Examiner—Louis J. Casaregola
Attorney, Agent, or Firm—Donald J. Singer; Gerald B. Hollins

[57] ABSTRACT

A solid fuel rocket burn rate control apparatus wherein grain preheating energy is supplied to the grain region just ahead of the regressing burn face by optical conductors such as fiber optic filaments that are buried in the grain and dispersed across the grain cross section. The optical conductors receive optical energy from one of several types of electrical-to-optical energy transducers such as a semiconductor laser or an incandescent source; the optical conductors promote coning burn action at the burn face of the rocket and allow control of the burn rate by electrically modified optical signals.

16 Claims, 3 Drawing Figures

ELECTRO-OPTICAL CONTROL OF SOLID FUEL ROCKET BURN RATE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of solid fuel rocket motors and the controlling of thrust in solid fuel rocket motors through the use of optically-transmitted fuel preheating.

Generally rocket motors may be classified according to their employment of liquid fuels, usually comprised of separate reservoirs of oxidizing and oxidizable materials, or solid fuels, usually comprised of a solid state mixture of oxidizing and oxidizable materials in a single fuel grain mass. Liquid fuel rockets depend upon the reaction or burning which occurs with physical contact of the oxidizing and oxidizable materials; such burning is usually initiated by a small source of external heat. Solid fuel rockets on the other hand depend upon burning which is initiated by elevating the surface temperature of the oxidizing-oxidizable mixture in at least a small region thereof to the temperature of ignition. Once ignited, the burning rate of a solid fuel rocket can be increased by preheating or raising the temperature of small areas in the fuel mass just prior to their participation in the burning reaction.

Solid fuel rockets are preferred for military and long mission uses because of their inherent simplicity and their avoidance of the complex plumbing, mixing, and control elements required in liquid fuel rockets and also because of the ease of safety with which the rocket fuel, or grain, can be handled and stored for future use. The design parameters, fuel selection tradeoffs, and operating characteristics of solid fuel rockets are well known in the art and are, for example, discussed in the textbooks "Rocket Propulsion Elements", 2d ed., by G. P. Sutton, and "Propellant Chemistry" by Stanley F. Sarver. The disclosure of these texts is hereby incorporated by reference into the present specification.

Modulation or termination of the thrust-producing reaction, once grain burn has been commenced, poses some difficulty in a solid fuel rocket; this difficulty is a characteristic of solid fuel rockets and makes it desirable to employ apparatus such as is described herein to achieve some degree of burn rate modulation or even thrust termination ability. A need for such thrust modulation or thrust termination and re-initiation can be readily appreciated in military or scientific rockets. The functions of threat avoidance, multiple purpose missions and vehicle atmospheric reentry each present a desirable environment for some form of thrust change, for example.

The present apparatus is principally concerned with thrust modulation or burn rate control during the grain burn of a solid fuel rocket. Such thrust modulation might, for example, also be desirable in tailoring the orbit of a spacecraft, in trading thrust magnitude for thrust duration in a particular rocket application, or in balancing the thrust applied to a multiple rocket vehicle—especially during the vehicle's initial liftoff, low air velocity, flight portion. Burn rate control can also be useful in achieving fixed levels of thrust which are independent of the fuel temperature variations resulting from atmospheric conditions.

The patent art includes several examples of arrangements achieving a degree of control over solid fuel rocket propulsion systems and includes the patent of J. Trotel, U.S. Pat. No. 3,457,726, which discloses a plurality of layered fuel arrangements that achieve incremental or intermittent control of the rocket thrust by way of periodically enabling the burn of new fuel increments. The Trotel apparatus contemplates the separation of fuel increments by inhibitor layers which are immune to the temperature of rocket operation and which must be violated for renewed fuel access—by the use of external energy such as heat or heat produced by electrical energy. The Trotel apparatus relies on these inert fuel-separating layers and their susceptibility to external energy as a thrust termination or periodic modulation mechanism and is uncovered with the effect of external energy on the fuel grain per se.

The patent of Ju Chin Chu, U.S. Pat. No. 3,732,693 describes a gel fuel apparatus, wherein fuel of a class intermediate the usual liquid and solid fuel types is utilized by way of pressure feeding, preheating, and use of a granulated oxidizer in order that controllable rocket thrust be attained.

Another example of a solid fuel rocket control apparatus is found in the patent of J. E. Picquendar, U.S. Pat. No. 3,398,537, which also employs externally suppplied electrical energy to maintain a supply of combustible fuel to the thrust generating reaction. The Picquendar invention employs a grain composition selected to give a non-self sustaining burn; this provides a rocket motor that is responsive to externally applied heat energy. The Picquendar apparatus contemplates the use of radiant heat from a fixed-location electrical resistance heat source and the use of this heat-based control mechanism principally for initiating and stopping thrust generation. The heater of the Picquendar apparatus is so disposed with respect to the grain as to be minimally and inconsistently effective in providing burn surface geometry change.

Another example of solid fuel rocket arrangements is found in the U.S. Patent of Hisao Okamoto et al, U.S. Pat. No. 4,369,710, which discloses an end burn arrangement of solid fuel wherein burn is enhanced through the use of heat conducting filament elements buried in the grain at manufacture and exposed to burn chamber temperatures during rocket operation. The Okamoto invention contemplates the forming of one or more cones in the fuel grain as a result of the preheating achieved with the heat conducting buried filaments. The Okamoto apparatus is principally concerned with the improvements achievable using a passive buried filament concept without extension of this concept into a modulation or control arrangement.

The patent of A. P. Adamson, U.S. Pat. No. 3,065,597, discloses a solid fuel rocket which is capable of the extinguishing and re-ignition functions through the use of burn chamber pressure control. The Adamson invention is based on the concept of burn in the rocket pressure vessel being dependent upon the presence of pressures above a certain threshold for continuation. The Adamson apparatus provides an arrangement for increasing the burn chamber temperature by external means up to the threshold of burn maintenance when re-ignition of the rocket is desired.

Another solid fuel rocket control arrangement is found in U.S. Patent of J. J. De Haye, U.S. Pat. No. 3,529,425, which discloses the use of electrodes that locate a preheating electric arc at the grain burn surface. Alternately, the De Haye patent uses electrodes having a tempeatureresponsive variable electrical resistance that is automatically activated for preheating by approach of the grain burn surface. The De Haye apparatus also contemplates the achievement of coning at the grain burn face through increased grain burn rate and application of the externally-sourced electrical energy.

Another example of a restartable solid fuel rocket motor is found in the patent of R. D. Wolcott, U.S. Pat. No. 3,248,875 which describes the use of electrically-heated igniter bands to reinitiate fuel grain burn.

Other examples of solid fuel rocket motor control are found in the patents of R. L. Rod, U.S. Pat. No. 3,066,482 and G. H. Messerly, U.S. Pat. No. 3,182,451, which concern respectively the achievement of increased burn rate by the addition of acoustic or other transponder-supplied elastic wave (vibratory) energy for increasing fuel combustion efficiency and the use of fluids in conductive tubes which pass through the body of the fuel grain for controlling the temperature of the fuel grain.

Additional examples of solid fuel rocket motor burn rate control are to be found in the Patents of R. H. Whitesides, Jr., U.S. Pat. No. 4,345,427, R. L. Glick, U.S. Pat. No. 3,381,476 and L. H. Caveny, U.S. Pat. No. 3,630,028. These patents concern improvement in the control apparatus employed with a retractable filament burn rate control, variations of retractable filament structure, and the addition of grain cutter elements to the ends of retractable filaments, respectively.

SUMMARY OF THE INVENTION

An object of the present invention is to provide a solid fuel rocket motor thrust control employing the optical transmission of fuel preheating energy.

Another object of the invention is to provide an electrically energizable, non-moving part thrust control arrangement for a solid fuel rocket motor.

Another object of the invention is to provide an arrangement for compensating manufacturing lot variations which occur in solid fuel rocket motor grain.

Another object of the invention is to provide a solid fuel rocket motor control arrangement which employs a non-fixed location, moving situs source of preheating energy or ignition within the fuel grain.

Another object of the invention is to provide a solid fuel rocket preheating or ignition arrangement which employs an electrical-to-optical transducer element such as a laser or an incandescent lamp as a source of optical preheat energy.

Another object of the invention is to provide an arrangement capable of compensating for the effect of atmospheric temperature changes on the burn rate of solid fuel rocket motors.

The objects are achieved by providing apparatus for adjusting the burn rate of a solid fuel rocket motor which includes the combination of means for transducing an electrical burn rate control signal into an optical control signal, means for conducting the optical control signal to the burn surface of a solid fuel rocket motor and means for converting the optical control signal to fuel preheating burn rate controlling heat energy.

BRIEF DESCRIPTION OF THE DRAWINGS

FIG. 1 includes a magnified portion showing details of the optical burn rate control apparatus.

DETAILED DESCRIPTION

Figure 1:
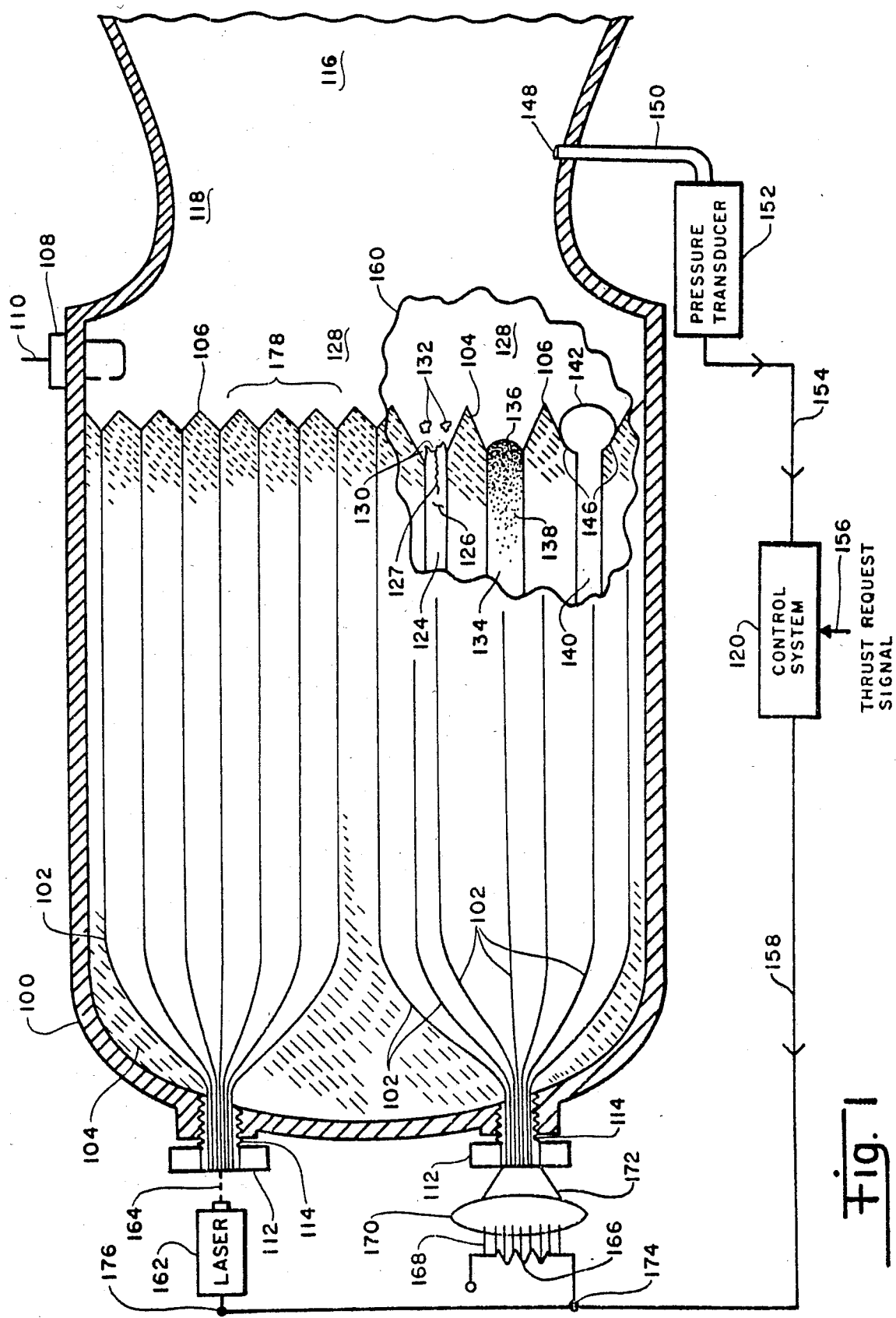
FIG. 1 is a solid fuel rocket employing optical burn rate control.

An end burn solid fuel rocket motor is shown in a lengthwise cross-sectional view in FIG. 1 of the drawings. In the FIG. 1 rocket motor, a pressure vessel 100 is used to enclose a solid fuel charge 104 that extends from a closed end of the pressure vessel 100 to a burn face area 178. The burn face area 178 is adjacent a combustion chamber 128 and the combustion chamber opens into a venturi area 118 and an exhaust nozzle 116. Extending through the solid fuel grain charge 104 in the FIG. 1 rocket are a plurality of optical conductors 102 which extend from the burn face area 178 through the fuel grain 104 to openings in the pressure vessel 100. The openings are fitted with pressure fittings 112 having threaded engagement 114 or some other sealing relationship with the pressure vessel 100.

With respect to the fuel grain 104 in FIG. 1, it is known in the solid fuel rocket motor art that the burn rate of most solid fuel compositions is variable according to the tempeature of the fuel just preceding onset of the burn reaction. In accordance with this concept, a preheating of most solid rocket fuels is found to increase the rate of fuel burning, the burn chamber pressure, and the developed rocket thrust in usable fashion. These events are somewhat circular in nature since the increase in burn chamber pressure itself further increases the grain burn rate in addition to the increased burn rate achieved from grain preheating. The above-referenced Okamoto U.S. Pat. No. 4,369,710, for example, employs this principle in increasing the thrust of a solid fuel rocket motor.

Several factors become operative in the accomplishment of increased burn rate as a result of local fuel preheating; these factors include the formation of cone-shaped distortions of the burn face area 178, with a resulting increase in burning fuel surface area even though only a small portion of the fuel adjacent the apex of each cone is heated by the i.e., by external energy source—the optical conductors 102 in FIG. 1. Increased burn surface area provides an increased rate of gas generation in the rocket motor and additionally results in higher pressure in the burn chamber 128 and thereby additionally increases the grain burn rate in bootstrap fashion. In principle, the establishment of cone areas, 106 in FIG. 1, in the grain burn face causes the burn to regress at the speed of the fastest-burning portion of the burn face over its entire area.

The term "optical" as used herein is employed as a matter of convenience and should not be interpreted as a limitation of the invention. The energy for preheating or ignition of the fuel grain can of course reside outside the visible spectrum and can include energy in the infrared, visible, near ultraviolet, and far ultraviolet ranges—including energy in the electromagnetic spectrum range of 0.2 microns to 35 microns.

The preheating required to achieve the burn face cones, 106 in FIG. 1 is actually limited to relatively small volumes of the grain 104 and need not include the entire grain mass, or even an entire burn face cross-section of the grain mass in order to initiate increased burn rate and cone action. Preheating or ignition actually need only involve small areas of the grain immediately adjacent the preheating elements, the optical conductors 102, just below the grain burn surface.

Preferably, the preheating or ignition elements in FIG. 1, the optical conductors 102, are dispersed uniformly across the surface of the burn face cross-sectional area of the grain 104 using separation distances which provide desirable cone dimensions during grain burn. The FIG. 1 illustrated arrangement of the optical conductors 102 is therefore typical and representative of larger or smaller arrays of such elements which would be employed in a given embodiment of the invention—depending inter-alia on such considerations as attainable cone dimensions in a particular type of grain, desired throttle response speed of the rocket motor and physical properties of the conductors 102 and the grain 104.

It should be realized that the relative orientations of the grain 104 and the optical conductors 102 shown in FIG. 1 are also but typical of arrangements which might be achieved. For example, interior burn surface grain configurations having a hollow or contoured open center area with optical conductors dispersed radially around the open center area can also be arranged so that optical preheat energy modulates a radial burn progression.

It should be also understood that the FIG. 1 apparatus might represent several different types of rocket motors, including, for example, a ducted rocket involving a fuel-rich grain 104 and partial grain burn in the chamber 128 together with final burn in a secondary ramjet or turbine chamber, a gimbal mounted rocket such as might be employed where vehicle guidance and stability are required, and a small-sized steering or stabilizing rocket as is also used for attitude control of a space vehicle. The FIG. 1 apparatus may also be used in the case of rocket motors which are exposed to variations in atmospheric temperature but which are nevertheless required to provide predetermined amounts of thrust.

In the area 160 in FIG. 1 there is shown an expanded view of three optical conductors 102 in order that arrangements for transferring grain preheating or ignition energy from the optical conductors to the fuel grain 104 can be described more clearly. In the expanded view 160, three different temperature-induced terminations of optical conductors 102 are represented by the conductors 124, 134 and 140 together with three different arrangements for achieving heat transfer between a conductor and the fuel grain 104.

The heat transfer arrangement represented for the optical conductor 124 at the top of the expanded view 160 is based on physical disintegration of the conductor in several forms. One example of this physical disintegration is represented by the spalling cavities shown at 130 while the radial and longitudinal stress fractures 126 and 128 represent additional forms of temperature-induced conductor disintegration. The temperature-induced disintegration can also include the processes of ablation or pyrolization which result in rapid decomposition of the optical conductor or fiber. Further manifestations of disintegration of optical conductor 124 are indicated by the separated particles 132; such particles result from a continuous breakup of the conductor into the combustion chamber 128 with regression of the burn face 178 into the body of the grain 104. The separated particles are, of course, effective in stopping the transmission of optical energy along conductor 124.

By way of the spalling, fracturing, ablation, and separation of particles from optical conductor 124 the optical transmission characteristics of this conductor are sharply degraded—degraded to such an extent that dissipation of a substantial portion of the optically-transmitted energy occurs near the burn face end of the conductor. Such dissipation is in a manner and location which is desirable for achieving grain preheating or grain ignition in the region just ahead of the receding burn face.

Radial and longitudinal cracking and spalling of the optical conductor 124 may represent the response of a relatively hard or brittle conductor material to the rapidly-increasing temperature resulting from regression of the burn face 178. An alternate response to this rapid increase in optical conductur temperature is shown for the conductor 134 in the expanded view 160. In this alternate response, a change of optical conductive capability in the nature of conductor darkening or opacity change is indicated. The darkening or opacity change in the conductor 134 is indicated in FIG. 1 by the graduated shading which becomes more intense toward the burn face surface end of the conductor. This darkening or opacity provides sharply increased transmission losses and dissipation of the optical energy into the fuel grain 104 in the desired grain preheat or ignition region just ahead of the receding burn face. This darkening effect for the conductor 134 is attainable through the use of doping of the optical conductor material with dopants including the materials commonly used in light-responsive sunglasses. Other dopants from the class of materials used in the photographic art are also potentially usable in the darkening or opacity change light conductor 134. Yet another arrangement that is potentially useful for the conductor 134 is found in the noticeable darkening of some glasses in response to energy exposure; such darkening is commonly found in an old X-ray tubes and old high voltage shunt regulator vacuum tubes (e.g., of the 6BK4 commercial type) that are employed in color television receivers.

A third response to the temperature of combustion chamber 128 is indicated for the optical conductor 140; this response is in the form of a melting of the conductor 140 with a resulting transfer of heat to the grain 104 by way of radiation from a molten ball of conductor material 142 and conduction along the touch paths 146.

Figure 3:
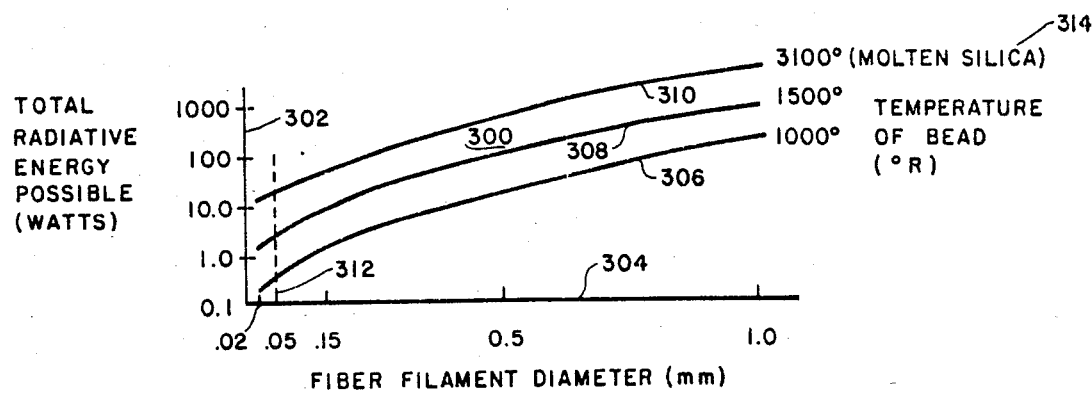
FIG. 3 shows a family of curves describing heat transfer between an optical conductor and the fuel grain in FIG. 1.

FIG. 3 of the drawings indicates the theoretical quantities of energy that could be transmitted by radiation from a molten bead of glass-like material of the type shown at 142 in FIG. 1 where the bead has attained one of three temperatures between 1000 and 3100 degrees Rankine. FIG. 3 assumes a radiant area of 66% and is based on the Stephen-Boltzmann law and the equation $$q = \sigma A [\epsilon_1 T_1^4 - \alpha T_2^4].$$

In FIG. 3, the exchanged energy is indicated along the vertical axis 302 and the filament diameter is indicated along the horizontal axis 304. The family of curves 300 includes the curve 306 for a temperature of 1000 degrees Rankine, the curve 308 for a temperature of 1500 degrees, and the curve 310 for a temperature of 3100 degrees—the temperature of molten silica as indicated at 314. Heat transferred by conduction along the paths 146 in FIG. 1 between the molten ball 142 and the grain 104 would of course be in addition to the indicated radiantly transferred heat.

For filament diameters of at least 50 microns as represented by the vertical dotted line 312 in FIG. 3, the molten bead would be sufficiently radiative to exchange a large total energy to the nearby propellant.

A selection between the three described forms of heat transfer from the optical conductors 102 to the grain 104, in a particular embodiment of the invention depends to a large degree upon the composition elected for the optical conductors 102. The molten ball heat transfer arrangement for the conductor 140, for example, results from the selection of conductor material having a low melting point and coefficients of thermal expansion which are sufficiently small to diminish mechanical disintegration prior to melting. The mechanical disintegration heat transfer described for the conductor 124, on the other hand, involves a higher melting temperature and thermal expansion properties in the nature of a brittle material such as is found in the response of ordinary household glassware items to sudden changes in temperature, i.e., the breaking of a drinking glass when shifted between cold and hot water baths, for example.

The family of glass identified as silica glass is known to have low thermal expansion and a high softening point temperature; this family of glasses and the boron oxide doped glasses are potential candidates for use in the optical conductors 134 and 140 in FIG. 1. Boron oxide glasses also have low thermal expansion characteristics, and are commonly used in cooking utensils. The process of optical fiber ablation for the conductor 124 which was mentioned above can be achieved by fibers which are based on organic materials. Ablation of such materials would be similar to the process which occurs in high-temperature operation of space vehicle re-entry heat shields.

Figure 2:
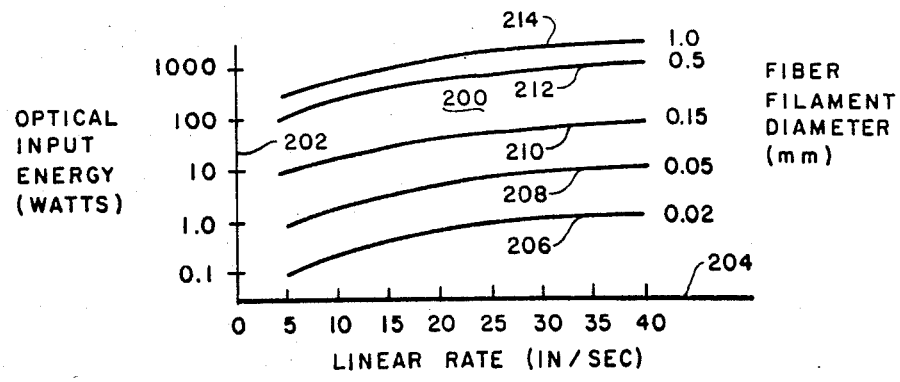
FIG. 2 shows a family of curves describing the melting rate of exemplary optical conductors in the FIG. 1 apparatus.

The molten ball of optical conductor material 142 is realized by a combination of heat energy received from the combustion chamber 128 and optically transmitted energy conveyed by the conductor 140. The typical input energy levels required to cause such melting of a glass fiber at a given linear rate are shown in FIG. 2 of the drawings. In FIG. 2, the family of curves 200 represents the linear rate of melt progression, indicated along the scale 204, with changing optical energy input levels, indicated along the vertical axis 202, and as a function of optical fiber diameter. The curves 206, 208, 210, 212 and 214 in FIG. 2 represent energy input and melt rate for fiber filament diameters between 0.02 millimeter and 1.0 millimeters. The FIG. 2 curves assume typical glass properties to prevail.

The numerical values in FIGS. 2 and 3 also indicate potentially usable diameters for the optical conductors 102. Filaments of the indicated diameters are commonly used and are available from commercial suppliers. The larger filaments are capable of transmitting greater quantities of energy, as indicated in FIG. 3, and are more easily fabricated from some conductor materials but are also more limited in ability to withstand sharp bending and other physical abuse that may attend locating of the filaments in the grain 104. Parallel combinations of several smaller filaments at each conductor location in the grain may be preferable to the use of one or a few larger conductors in some fabrication sequences. The desired density of the conductor filaments at the burn face 178 may be determined from prior knowledge of coning properties for the selected grain using other grain preheating arrangements such as the wire retracting preheaters described in the prior art identified above.

Fabrication of the composite grain and fiber optic filament structure can be realized using liquid or semi-liquid introduction of the fuel grain into the pressure vessel 100 from an access port located adjacent the pressure fittings 112 and not shown in FIG. 1, together with holding the conductors 102 in a temporary jig or in a wire support until surrounded by the introduced grain. Fragility of the filaments during "freezing" of the liquid grain into a solid mass must of course be considered.

The filaments of the optical conductors 102 in FIG. 1 may of course be collected into groups of plural filaments for increased physical strength and for achieving larger size burn face cones 106 where the properties of either the filaments or the grain 104 require. Additionally, the filaments of the optical conductors 102 may be protected either individually or in groups by a sheath of metallic or non-metallic material such as the "spaghetti tubing" commonly used in electrical and electronic wiring when required.

The ignition of solid fuel rocket propellants generally involves temperatures between 180° C. and 350° C. at the burn face of the fuel grain. The energy density for achieving ignition has been reported in the published literature to be between 0.3 and 15 Joules per centimeters squared for pyrotechnic compositions of UN hazardous classification type 1.1 and between 20 and 500 Joules per centimeters squared for various gun and rocket propellants in UN hazard classification 1.3. Total energy in the range of 22.6 Joules has been successfully used in producing laser ignition of propellant grain.

Initial ignition of the burn face 178 in FIG. 1 may, in view of these energy requirements, be attained by energy supplied through the optical conductors 102 or alternately and more practically through the use of a conventional igniter device such as is shown symbolically at 108 in FIG. 1 and controlled by the electrical conductor 110. Ignition by way of the optical energy supplied by the conductors 102, when used, may also be employed for re-ignition of the FIG. 1 rocket motor following a shut-down achieved by a technique such as one of the prior art arrangements described above.

The burn rate control signals transmitted by the optical conductors 102 may originate in one of several types of optical energy sources. Several of these possible optical sources are indicated by the representations at 162 and 166 in FIG. 1. The block 162 in FIG. 1 represents a laser apparatus of the solid state diode type or the ionized gas type (such as, for example, a heliumneon or $C_2$ laser). Solid state diode lasers are, of course, desirable for use in the harsh physical environment of a rocket motor and in military equipment; such devices are commonly available with laser power outputs of 1 watt when operated in the continuous wave mode. A laser power output of 1 watt and a fiber optic filament of 250 micrometers diameter using the high transmissibility and low loss type of optical conductor filaments is, according to theory, capable of providing energy densities greater than 2 kilowatts per centimeters squared. Since an optical fiber typically has a 50% energy loss per kilometer of length, the energy loss is negligible for the 10 meters or less of filament length needed for a solid fuel rocket motor.

Transmission of optical energy from the laser 162 to the ends of the optical conductors 102 is indicated at 164 in FIG. 1 and may be achieved through the use of energy coupling extensions to the optical conductors 102, lenses, fluids or other optical conducting arrangements known in the art.

A source of energy alternate to the laser 162 is represented by the resistance element 166 in FIG. 1. This element is intended to generically represent incandescent devices such as lamps, or infrared resistance heaters, and other forms of electrical-to-optical energy transducers such as ionized plasma devices of the flash lamp or electrical arc type. Transmission of optical energy between the element 166 and the optical conductors 102 is indicated along the paths 168 and 172, and may include such apparatus as the optical lens 170.

For some of the indicated electrical-to-optical energy transducers, incorporation of the transducer device within the pressure vessel 100 is a practical possibility. Especially in the instance of the diode laser transducer, such a device could be buried within the fuel grain adjacent the closed end of the pressure vessel. Moreover, a multiplicity of such devices each connecting to a different one or group of optical conductors 102 may be employed. With such incorporation of the electrical-to-optical transducer within the pressure vessel, only electrical conductors need pass through the pressure vessel walls. In many applications of the invention, however, the avoidance of electrical circuits within the rocket pressure vessel is preferable; for such applications, the illustrated passage of optical transmission elements through the pressure vessel wall is desirable.

In many uses of the burn rate control apparatus, closed-loop or feedback operation is desirable. In the above-described multiple rockets on a single vehicle or in applications where a predetermined specific level of thrust is needed, for example, a closed-loop feedback arrangement as indicated by signals transmitted along the paths 154 and 158 in FIG. 1 allows needed correction for thrust variations. According to a closed-loop feedback control arrangement for the FIG. 1 rocket motor, a signal representing the attained degree of thrust is obtained from a suitable source such as a strain guage in the rocket mounting or from a pressure transducer that is responsive to burn chamber pressure. In FIG. 1, such a signal is provided by the conduit 150 which connects with an opening 148 in the venturi area 118 or in the combustion area 128 of the rocket motor. Pressure in the conduit 150 is converted to an electrical signal by the pressure transducer 152 for use in the control system 120. In the control system 120, a comparison between the pressure signal and a thrust request signal 156 is made. The difference between the thrust request signal and the pressure transducer signal is indicated in FIG. 1 by an energy-modulated electrical signal along the path 158. An energy-modulated electrical signals can include amplitude varying signals, pulse width or duty cycle controlled signals, or other modulated signals which are known in the art.

Some connection of the resistance element 166 to the path 158 as indicated at 174 is required to achieve an amplitude and duty cycle modulated optical control signal in FIG. 1. The combination of the control 120 and the elements 162 and 166 may involve signal amplification through the use of semiconductors or other amplifier devices in the control 120 when the actual preheating energy is to be obtained from the signal of path 158. The signal of the path 158 may alternately be of a lower level where the needed amplification and large energy source are included in the transducer device, as is common practice with the ionized gas laser that may be used at 162 in FIG. 1. In such devices the actual preheating energy is supplied by an electrical source which is not shown in FIG. 1 and the electrical-to-optical transducer converts this energy to optical form under the control of the signal received along path 158.

The present invention provides several desirable features in a solid fuel rocket motor, especially notable among these features are the absence of fragile moving parts within the rocket motor pressure vessel and the total absence of need for electromechanical apparatus—for withdrawing metallic filaments from the rocket combustion area for example. Other advantages of the invention include an ability to control the size of the developed burn face cones by use of suitable spacings between the optical conductors, an ability to exclude electrical circuits from the pressure vessel, the potential use of the supplied optical energy as an initial ignition mechanism for the rocket, the ability to compensate for manufacturing variations in a rocket, and the desirable manner in which the location of the grain preheating source changes in response to regression of the burn face into the grain. Another desirable feature of the invention concerns the inherent protection of the optical conductors from physical disturbance by their location within the cold, non-ignited mass of fuel grain at the closed end of the pressure vessel; such arrangements are notably improved over the prior art burn rate devices which necessarily include the source of preheating energy within the combustion area of the rocket where it is subject to damage. The light weight, chemical stability, and relative immunity of the buried optical conductors to physical damage are additional advantages of the invention.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Apparatus for adjusting the burn rate of a solid fuel rocket motor comprising the combination of:
    means for transducing an electrical burn rate control signal into an optical control signal;
    means for conducting said optical control signal through the unburned mass of said solid fuel to the fuel burn face of said rocket motor; and
    means located adjacent said burn face for converting said optical control signal to fuel preheating burn rate controlling heat energy.

2. The apparatus of claim 1 wherein said means for converting said optical control signal to heat energy includes physical modification of said means for conducting in response to locally elevated temperature thereof at said burn face.

3. The apparatus of claim 2 wherein said means for converting includes means responsive to the regression of the fuel burn face into said solid fuel for concurrently moving the burn face terminus of said means for conducting optical control signal.

4. The apparatus of claim 3 wherein said optical control signal is modulated in response to energy modulation of said electrical burn rate control signal.

5. The apparatus of claim 4 wherein said means for conducting includes fiber optic elements.

6. The apparatus of claim 5 wherein said means for converting includes heat-responsive degradation of the optical transmission capability of said fiber optic elements.

7. The apparatus of claim 6 wherein said heat-responsive degradation comprises melting.

8. The apparatus of claim 6 wherein said heat-responsive degradation comprises physical disintegration of said fiber optic element.

9. The apparatus of claim 6 wherein said heat-responsive degradation includes thermally-induced increased optical opacity of said fiber optic element.

10. The apparatus of claim 6 wherein said means for transducing includes a laser.

11. Thrust controllable solid fuel rocket motor apparatus comprising:
   a rocket pressure vessel containing a solid fuel grain charge having a burn face surface disposed in communication with a rocket nozzle;
   optical energy conducting means extending from the exterior of said pressure vessel through said fuel grain charge to said burn face surface for conducting fuel grain preheating energy to the grain adjacent said burn face surface;
   electrical-to-optical energy transducer means optically coupled to the portion of said energy conducting means exterior of said pressure vessel for supplying optical energy to said energy conducting means and said grain adjacent said burn face surface; and
   means for controlling the electrical energy supplied to said electrical-to-optical energy transducer means in response to a rocket burn rate control signal.

12. The apparatus of claim 11 wherein said optical energy conducting means includes a plurality of fiber optic filaments.

13. The apparatus of claim 12 wherein said electrical-to-optical energy transducer means includes a laser.

14. The apparatus of claim 13 wherein said laser is a solid state semiconductor diode laser.

15. Controllable burn rate solid fuel rocket motor apparatus comprising the combination of:
   a rocket pressure vessel communicating with a combustion discharge nozzle.
   a charge of heat-ignitable solid rocket fuel contained within said pressure vessel opposite said discharge nozzle;
   a plurality of temperature-actuated optical energy communicating fuel preheating elements communicating with the exterior of said pressure vessel and extending through said fuel charge to a burn face thereof adjacent said nozzle, said preheating elements being dispersed over the burn face cross-section of said fuel charge and being capable of transducing optical energy to heat energy in local end portions thereof in response to increasing end portion temperature;
   laser means optically coupled to the portions of said fuel preheating elements exterior of said pressure vessel for converting electrical energy to optical energy received by said optical energy communicating elements; and
   electrical control means connected with said laser means for controlling the electrical energy dissipation and the fuel preheating temperature of said preheating elements.

16. The apparatus of claim 15 wherein said optical energy communicating elements comprise fiber optic elements.

* * * * *